US009305568B2

(12) United States Patent
Kraft et al.

(10) Patent No.: US 9,305,568 B2
(45) Date of Patent: Apr. 5, 2016

(54) ACTIVE ACOUSTIC FILTER WITH SOCIALLY DETERMINED LOCATION-BASED FILTER CHARACTERISTICS

(71) Applicant: Doppler Labs, Inc., New York, NY (US)

(72) Inventors: Noah Kraft, Brooklyn, NY (US); Richard Fritz Lanman, III, New York, NY (US); Dan Wiggins, Montecito, CA (US)

(73) Assignee: Doppler Labs, Inc., New York, NY (US)

(*) Notice: Subject to any disclaimer, the term of this patent is extended or adjusted under 35 U.S.C. 154(b) by 0 days.

(21) Appl. No.: 14/930,887

(22) Filed: Nov. 3, 2015

(65) Prior Publication Data

US 2016/0055861 A1 Feb. 25, 2016

Related U.S. Application Data

(63) Continuation of application No. 14/681,843, filed on Apr. 8, 2015.

(60) Provisional application No. 61/976,794, filed on Apr. 8, 2014.

(51) Int. Cl.
*H03G 5/00* (2006.01)
*G10L 21/0208* (2013.01)
(Continued)

(52) U.S. Cl.
CPC .......... *G10L 21/0208* (2013.01); *H04R 1/1083* (2013.01); *H04R 3/04* (2013.01); *G10L 2021/02082* (2013.01); *H04R 2225/55* (2013.01); *H04R 2460/07* (2013.01)

(58) Field of Classification Search
CPC .................... G06F 17/30749; G06F 17/30761; G06F 13/385; G06F 3/165; G06F 3/011; G06F 3/167; G06F 17/30026; H04M 1/72527; H04M 1/72558; H04M 1/72591; H04M 1/60; H04M 1/6058; H04M 1/6066; H04R 2420/07; H04R 1/1041; H04R 1/1091; H04R 1/10; H04R 1/08; H04R 1/1083; H04R 1/32; H04R 1/46; H04R 2460/13; H04R 29/00; H04R 3/12; H04R 3/00; H04R 3/005; H04R 5/033; H04R 5/04; H04R 2225/55; H04R 3/04; H04R 2460/07; H04S 1/007; H04S 1/005; H04S 7/301; H04S 7/303; G10L 15/20; G10L 2015/223; G10L 2021/02166; G10L 21/0208; G10L 25/03; G10L 25/51; G10L 2021/02082
USPC .......... 381/23.1, 92, 26, 56, 57, 60, 312, 313, 381/314, 315, 317, 318, 320, 321, 61, 66, 381/72, 74, 73.1, 86, 91, 93, 94.1, 94.2, 381/94.3, 94.4, 94.7, 94.8, 94.9, 95, 96, 97, 381/98, 99, 100, 101, 102, 103, 120, 121, 381/122, 71.1–71.14, 334; 455/414.1, 455/414.2, 404.2, 404.1, 440, 422.1, 456.1, 455/456.2, 456.3, 456.4, 456.6, 457; 704/E19.013, E19.014, 704/E21.002–E21.009, E21.014; 379/406.01–406.16; 700/94
See application file for complete search history.

(56) References Cited

U.S. PATENT DOCUMENTS 7,283,850 B2 * 10/2007 Granovetter .......... G06F 17/289 381/122
8,335,312 B2 * 12/2012 Gerhardt ............ H04M 1/6066 379/430

(Continued)

FOREIGN PATENT DOCUMENTS

WO 2013069556 A1 5/2015

*Primary Examiner* — Leshui Zhang
(74) *Attorney, Agent, or Firm* — SoCal IP Law Group LLP; Steven C. Sereboff; Jonathan Pearce

(57) ABSTRACT

There is disclosed active acoustic filter systems and methods. A processor is disposed within a housing configured to interface with a user's ear. A memory stores data defining one or more locations and a respective set of location-based processing parameters associated with each of the one or more locations. A personal computing device external to the housing is coupled to the processor via a first wireless communications link. The personal computing device determines a current location of the active acoustic filter system. The processor generates digitized processed sound by processing digitized ambient sound in accordance with a set of location-based processing parameters retrieved from the memory, the retrieved set of location-based processing parameters associated with the current location of the active acoustic filter system as determined by the personal computing device.

9 Claims, 6 Drawing Sheets

(51) Int. Cl.
*H04R 3/04* (2006.01)
*H04R 1/10* (2006.01)

(56) References Cited

U.S. PATENT DOCUMENTS 8,649,540 B2 2/2014 Killion et al.
8,750,544 B2 6/2014 Killion et al.
2004/0052391 A1* 3/2004 Bren ...................... H04R 25/43 381/331
2008/0118078 A1* 5/2008 Asada ..................... H04S 3/008 381/74
2010/0022269 A1* 1/2010 Terlizzi ................... H04M 1/05 455/556.1
2010/0033313 A1* 2/2010 Keady .................. G08G 1/0965 340/438
2011/0188389 A1* 8/2011 Hedley .................. G01S 5/0215 370/252
2011/0228950 A1* 9/2011 Abrahamsson ..... H04M 1/6058 381/94.1
2011/0243344 A1* 10/2011 Bakalos ............. G10K 11/1784 381/71.6
2013/0208909 A1 8/2013 Mulder
2014/0046659 A1* 2/2014 Burton .................... G10L 25/48 704/226
2014/0105412 A1* 4/2014 Alves ................. G10K 11/1784 381/71.6
2014/0185828 A1* 7/2014 Helbling ................ H03G 5/165 381/103
2014/0198926 A1 7/2014 Killion et al.
2014/0221017 A1* 8/2014 Jensen .................. H04W 4/028 455/456.3
2014/0277650 A1* 9/2014 Zurek ...................... H04R 3/00 700/94
2014/0314245 A1* 10/2014 Asada ................ G10K 11/1788 381/71.6
2014/0321660 A1 10/2014 Harsch

* cited by examiner

© 2015 Doppler Labs

500

© 2015 Doppler Labs

600

© 2015 Doppler Labs

ACTIVE ACOUSTIC FILTER WITH SOCIALLY DETERMINED LOCATION-BASED FILTER CHARACTERISTICS

RELATED APPLICATION INFORMATION

This patent is a continuation of co-pending patent application Ser. No. 14/681,843, entitled "Active Acoustic Filter with Location-Based Filter Characteristics," filed Apr. 8, 2015, which claims priority from provisional patent application 61/976,794, entitled "Digital Acoustical Filters for Use in Human Ears and Method for Using Same", filed Apr. 8, 2014, both of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates generally to digital active audio filters for use in a listener's ear to modify ambient sound to suit the listening preferences of the listener. In particular, this disclosure relates to active audio filters that adapt to the listener's location.

2. Description of the Related Art

Humans' perception to sound varies with both frequency and sound pressure level (SPL). For example, humans do not perceive low and high frequency sounds as well as they perceive midrange frequencies sounds (e.g., 500 Hz to 6,000 Hz). Further, human hearing is more responsive to sound at high frequencies compared to low frequencies. FIG. 1 illustrates equal loudness contours defined in ISO (International Standards Organization) Standard 226(2003). The X axis represents sound frequency measured in Hertz (Hz) and the Y axis represents sound pressure level measured in decibels (dB) relative to a pressure level of $2\times10^{-5}$ Pascal. The unit of measurement for loudness levels is the phon, and is arrived at by reference to equal-loudness contours. FIG. 1 shows equal loudness contours for loudness levels of 20, 40, 60, 80, and 100 phon. Each equal-loudness contour defines the sound pressure level, over the frequency spectrum, for which a listener perceives a constant loudness when presented with pure steady tones. FIG. 1 also shows the hearing threshold level.

Hearing protection that attenuates sound equally at all frequencies, or otherwise without regard to the variation of hearing sensitivity with frequency, may attenuate potentially damaging sounds at the expense of pleasurable sounds. For example, an ear filter providing uniform attenuation of 20 dB would reduce loudness by about 20 phon at 1 kHz and 40 phon at 20 Hz. Thus the relative loudness of low frequency sounds would be substantially reduced relative to the loudness of higher frequency sounds. However, with attention to the hearing response curves, it is possible to design ear filters that attenuate damaging sound levels and maintain, or even enhance, desired sounds.

There are many situations where a listener may desire protection from ambient sound at certain frequencies, while allowing ambient sound at other frequencies to reach their ears. For example, at a concert, concert goers might want to enjoy the music, but also be protected from high levels of mid-range sound frequencies that cause damage to a person's hearing. On an airplane, passengers might wish to block out the roar of the engine, but not conversation. At a sports event, fans might desire to hear the action of the game, but receive protection from the roar of the crowd. While sleeping, people might want protection from all auditory disturbances. These are just a few common examples where people wish to hear some, but not all, of the sound frequencies in their environment.

In addition to receiving protection from unpleasant or dangerously loud sound levels, listeners may wish to augment the ambient sound by amplification of certain frequencies, combining ambient sound with a secondary audio feed, equalization (modifying ambient sound by adjusting the relative loudness of various frequencies), echo cancellation, or adding echo or reverberation. For example, at a concert, audience members may wish to attenuate certain frequencies of the music, but amplify other frequencies (e.g., the bass). People listening to music at home may wish to have a more "concert-like" experience by adding reverberation to the ambient sound. At a sports event, fans may wish to receive audio protection from ambient crowd noise, but also receive an audio feed of a sportscaster reporting on the event. In yet another example, people at a mall may wish to attenuate the ambient noise, yet receive an audio feed of advertisements targeted to their location. These are just a few examples of peoples' audio enhancement preferences. Further, a person's audio enhancement preferences are individual and change regularly depending on the environment.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
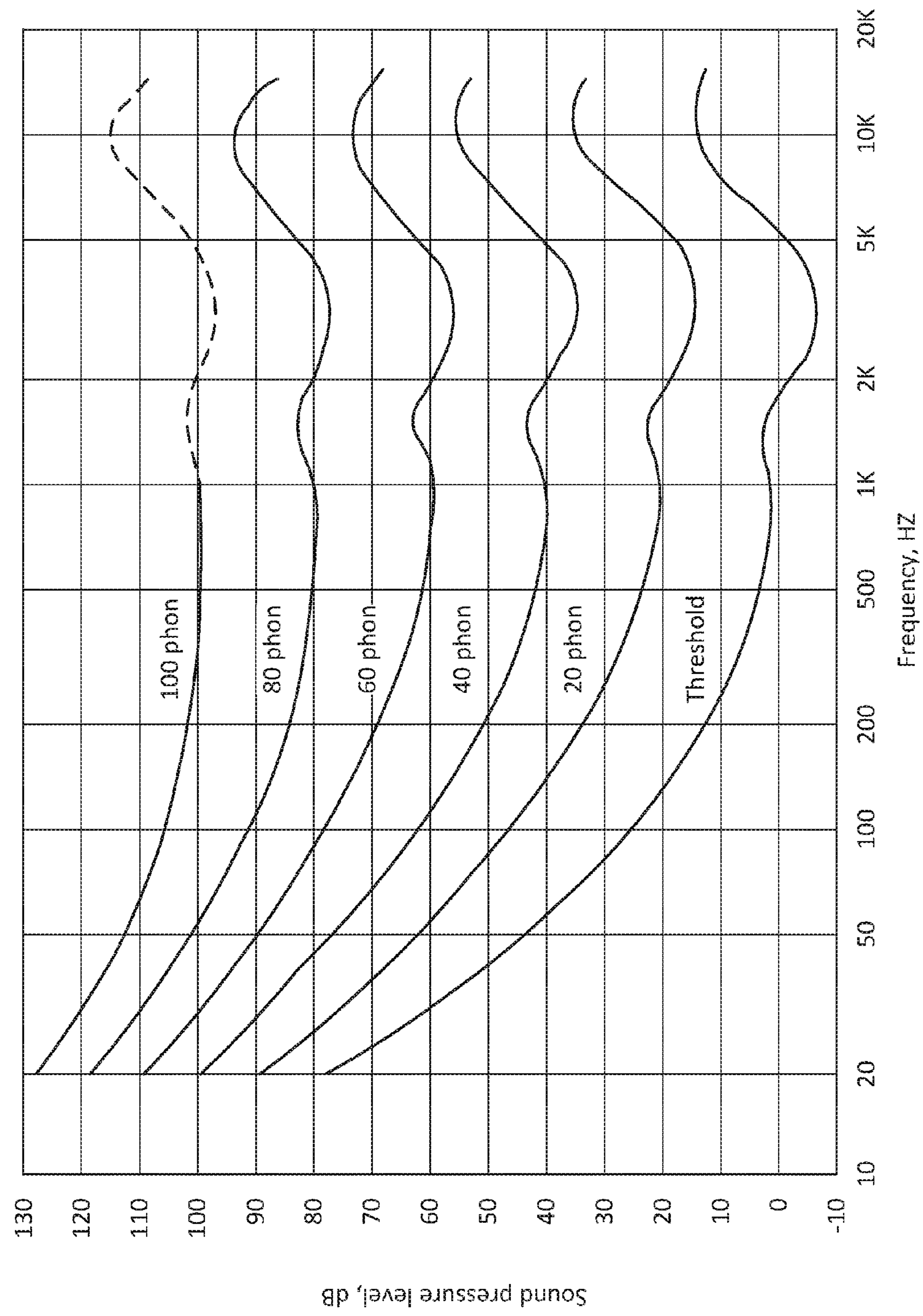
FIG. 1 illustrates a graph of equal-loudness contours.
Figure 2:
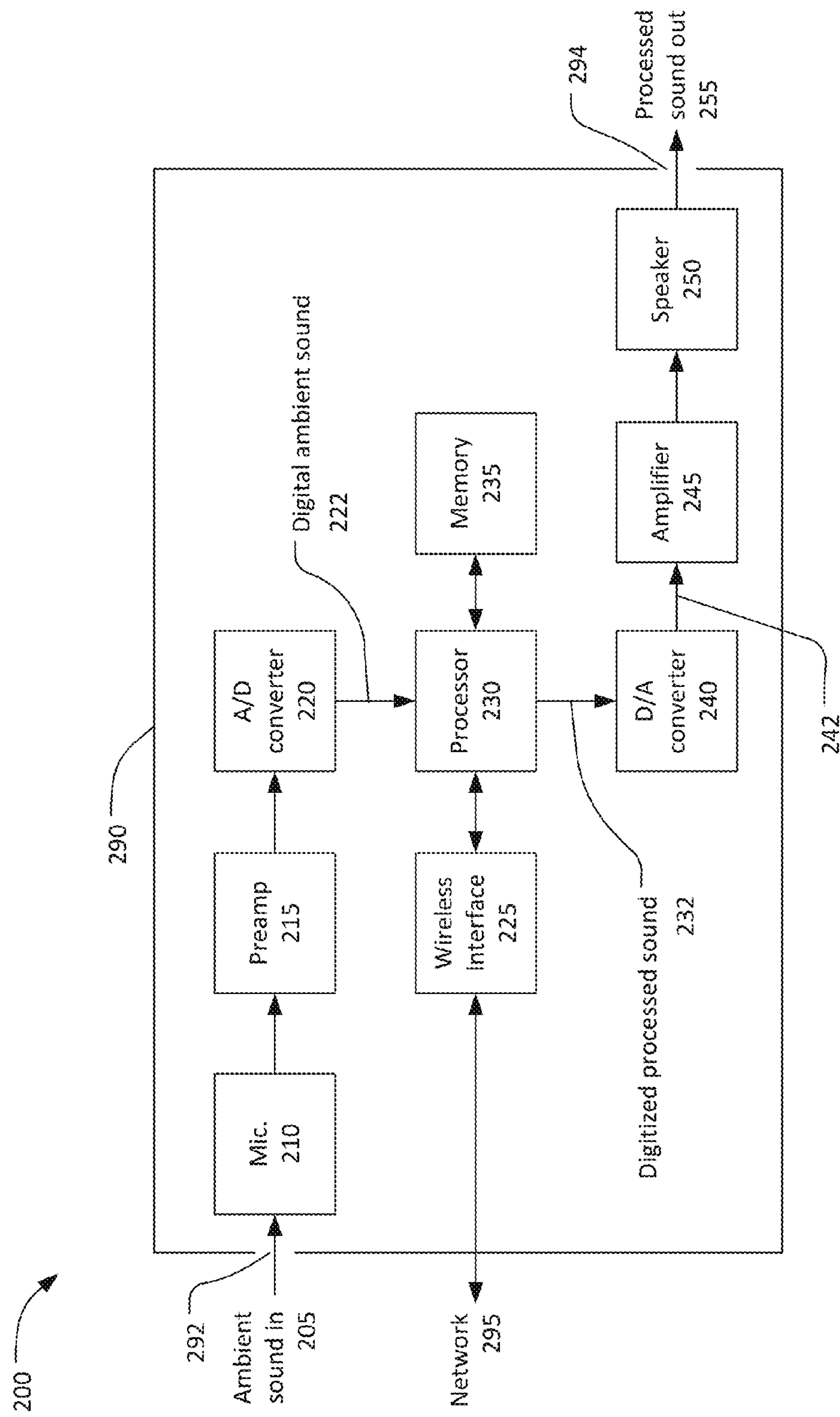
FIG. 2 is block diagram of an active acoustic filter.

FIG. 2 is block diagram of an active acoustic filter 200. The active acoustic filter 200 may include a microphone 210, a preamplifier 215, an analog-to-digital (A/D) converter 220, a wireless interface 225, a processor 230, a memory 235, an analog signal by digital-to-analog (D/A) converter 240, and amplifier 245, a speaker 250, and a battery (not shown), all of which may be contained within a housing 290. The housing 290 may be configured to interface with a user's ear by fitting in, on, or over the user's ear such that ambient sound is mostly excluded from reaching the user's ear canal and processed sound generated by the active acoustic filter is coupled into the user's ear canal. The housing 290 may have a first aperture 292 for accepting ambient sound and a second aperture 294 to allow processed sound to be output into the user's outer ear canal.

The housing 290 may be, for example, an earbud housing. The term "earbud" means an apparatus configured to fit, at least partially, within and be supported by a user's ear. An earbud housing typically has a portion that fits within or against the user's outer ear canal. An earbud housing may have other portions that fit within the concha or pinna of the user's ear.

The microphone 210 converts ambient sound 205 into an electrical signal that is amplified by preamplifier 215 and converted into digital ambient sound 222 by A/D converter 220. The digital ambient sound 222 may be processed by processor 230 to provide digitized processed sound 232. The processing performed by the processor 230 will be discussed in more detail subsequently. The digitized processed sound 232 is converted into an analog signal by D/A converter 240. The analog signal output 242 from D/A converter 240 is amplified by amplifier 245 and converted into processed output sound 255 by speaker 250.

The depiction in FIG. 2 of the active acoustic filter 200 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the analog-to-digital (A/D) converter 220, the wireless interface 225, the processor 230, the memory 235, the analog signal by digital-to-analog (D/A) converter 240, and the amplifier 245 may be contained within a common signal processor circuit device.

The microphone 210 may be one or more transducers for converting sound into an electrical signal that is sufficiently compact for use within the housing 290.

The preamplifier 215 may be configured to amplify the electrical signal output from the microphone 210 to a level compatible with the input of the A/D converter 220. The preamplifier 215 may be integrated into the A/D converter 220, which, in turn, may be integrated with the processor 230. In the situation where the active acoustic filter 200 contains more than one microphone, a separate preamplifier may be provided for each microphone.

The A/D converter 220 may digitize the output from preamplifier 215, which is to say convert the output from preamplifier 215 into a series of digital ambient sound samples at a rate at least twice the highest frequency present in the ambient sound. For example, the A/D converter may output digital ambient sound 222 in the form of sequential sound samples at rate of 40 kHz or higher. The resolution of the digitized ambient sound 222 (i.e. the number of bits in each sound sample) may be sufficient to minimize or avoid audible sampling noise in the processed output sound 255. For example, the A/D converter 220 may output digitized ambient sound 222 having 12 bits, 14, bits, or even higher resolution. In the situation where the active acoustic filter 200 contains more than one microphone with respective preamplifiers, the outputs from the preamplifiers may be digitized separately, or the outputs of some or all of the preamplifiers may be combined prior to digitization.

The wireless interface 230 may provide digital acoustic filter 200 with a connection to one or more wireless networks 295 using a limited-range wireless communications protocol such as Bluetooth, Wi-Fi, ZigBee, or other wireless personal area network protocol. The wireless interface 225 may be used to receive data such as parameters for use by the processor 230 in processing the digital ambient sound 222 to produce the digitized processed sound 232. The wireless interface 225 may be used to export the digitized processed sound 232, which is to say transmit the digitized processed sound 232 to a device external to the active acoustic filter 200. The remote device may then store and/or publish the digitized processed sound via social media.

The processor 230 may include one or more processors such as a microcontroller, a microprocessor, and/or a digital signal processor. The processor 230 can include and/or be coupled to the memory 235. The memory 235 may store software programs for execution by the processor 230. The memory 235 may also store data for use by the processor 230. The data stored in the memory 235 may include, for example, digital sound samples and intermediate results of processes performed on the digital ambient sound 222. The data stored in the memory 235 may also include a user's listening preferences, and/or rules and parameters for applying particular processes to convert the digital ambient sound 222 into the digitized processed sound 232. The memory 235 may include a combination of read-only memory, flash memory, and static or dynamic random access memory.

The D/A converter 240 may convert the digitized processed sound 232 from the processor 230 into an analog signal 242. The processor 230 may output the digitized processed sound 232 as a series of samples typically, but not necessarily, at the same rate as the digital ambient sound 222 is generated by the A/D converter 220. The analog signal 242 output from the D/A converter 240 may be amplified by the amplifier 245 and converted into processed output sound 255 by the speaker 250. The amplifier 245 may be integrated into the D/A converter 240, which, in turn, may be integrated with the processor 230. The speaker 250 can be any transducer for converting an electrical signal into sound that is suitably sized for use within the housing 290.

The battery (not shown) may provide power to various elements of the digital acoustical filter 200. The battery may be, for example, a zinc-air battery, a lithium ion battery, a lithium polymer battery, a nickel cadmium battery, or a battery using some other technology.

Figure 3:
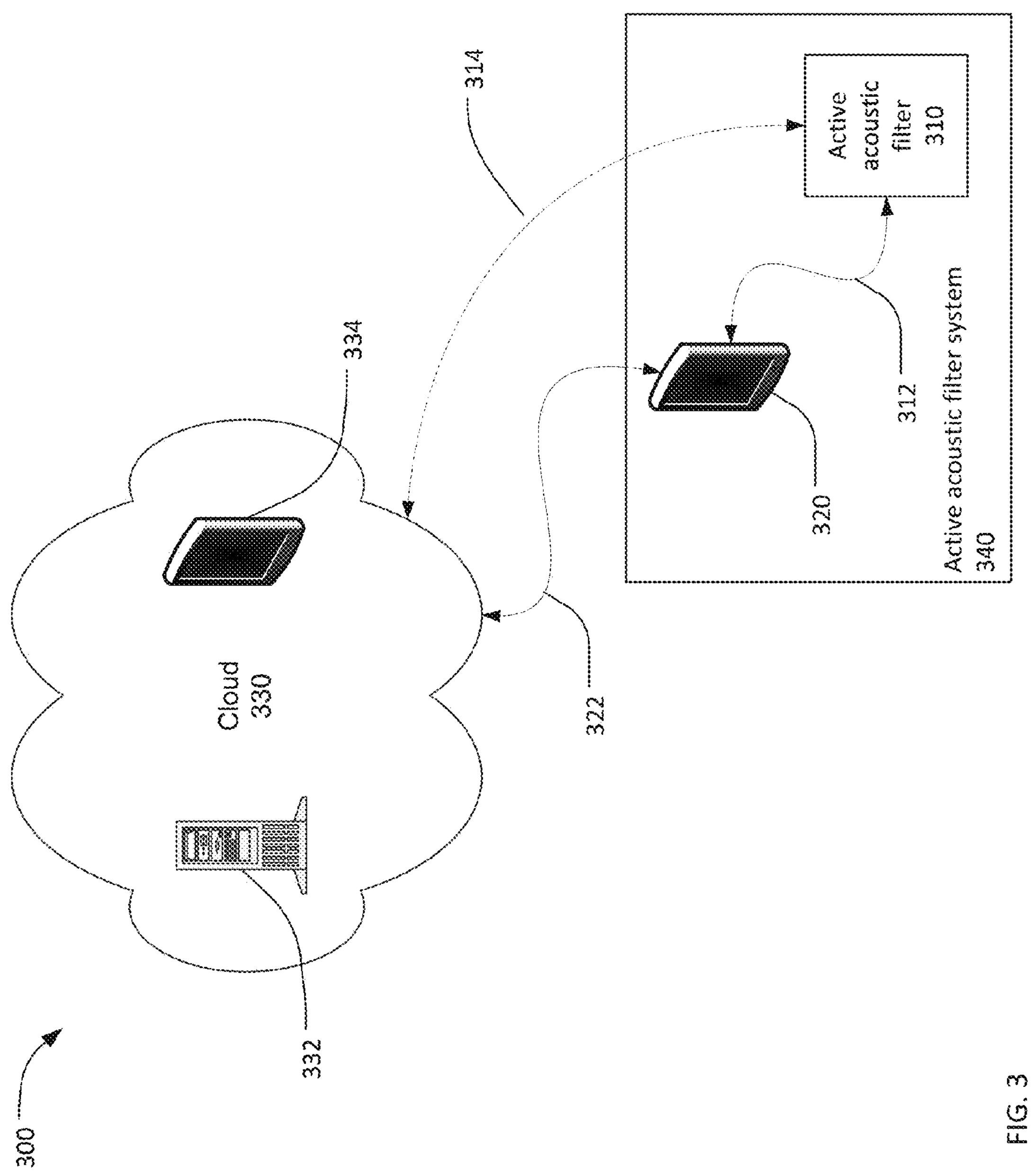
FIG. 3 is a block diagram of an environment.

Referring now to FIG. 3, an active acoustic filter 310 may be used within an environment 300 that also includes a personal computing device 320 and a cloud 330. In this context, the term "cloud" means a network and all devices that may be accessed by the active acoustic filter 310 and/or the computing device 320 via the network. The cloud 330 may be a local area network, wide area network, a virtual network, or some other form of network together with all devices connected to the network. The cloud 330 may be or include the Internet. The devices within the cloud 330 may include one or more servers 332 and one or more personal computing devices 334.

While the personal computing device 320 is shown in FIG. 3 as a smart phone, the personal computing device 320 may be a smart phone, a desktop computer, a mobile computer, a tablet computer, or any other computing device that is capable of performing the processes described herein. The personal computing device 320 may include one or more processors and memory configured to execute stored software instructions to perform the processes described herein. The personal computing device 320 may include a user interface comprising a display and at least one input device such as a touch screen, keyboard, and/or mouse. The personal computing device 320 may be configured to perform geo-location, which is to say to determine its own location. Geo-location may be performed, for example, using a Global Positioning System (GPS) receiver or by some other method.

The active acoustic filter 310 may communicate with the personal computing device 320 via a first wireless communications link 312. The first wireless communications link 312 may use a limited-range wireless communications protocol such as Bluetooth, Wi-Fi, ZigBee, or other wireless personal area network protocol. The personal computing device 320 may communicate with the cloud 330 via a second communications link 322. The second communications link 322 may be a wired connection or may be a wireless communications link using, for example, the WiFi® wireless communications protocol, a cellular telephone data protocol, or another wireless communications protocol.

Optionally, the active acoustic filter 310 may communicate directly with the cloud 330 via a third wireless communications link 314. The third wireless communications link 314 may be an alternative to, or in addition to, the first wireless communications link 312. The third wireless connection 314 may use, for example, the WiFi® wireless communications protocol, or another wireless communications protocol.

The active acoustic filter 310 and the personal computing device 320 may collectively form an active acoustic filter system 340. The personal computing device may run an application program or "app" to perform the functions described herein.

Figure 4:
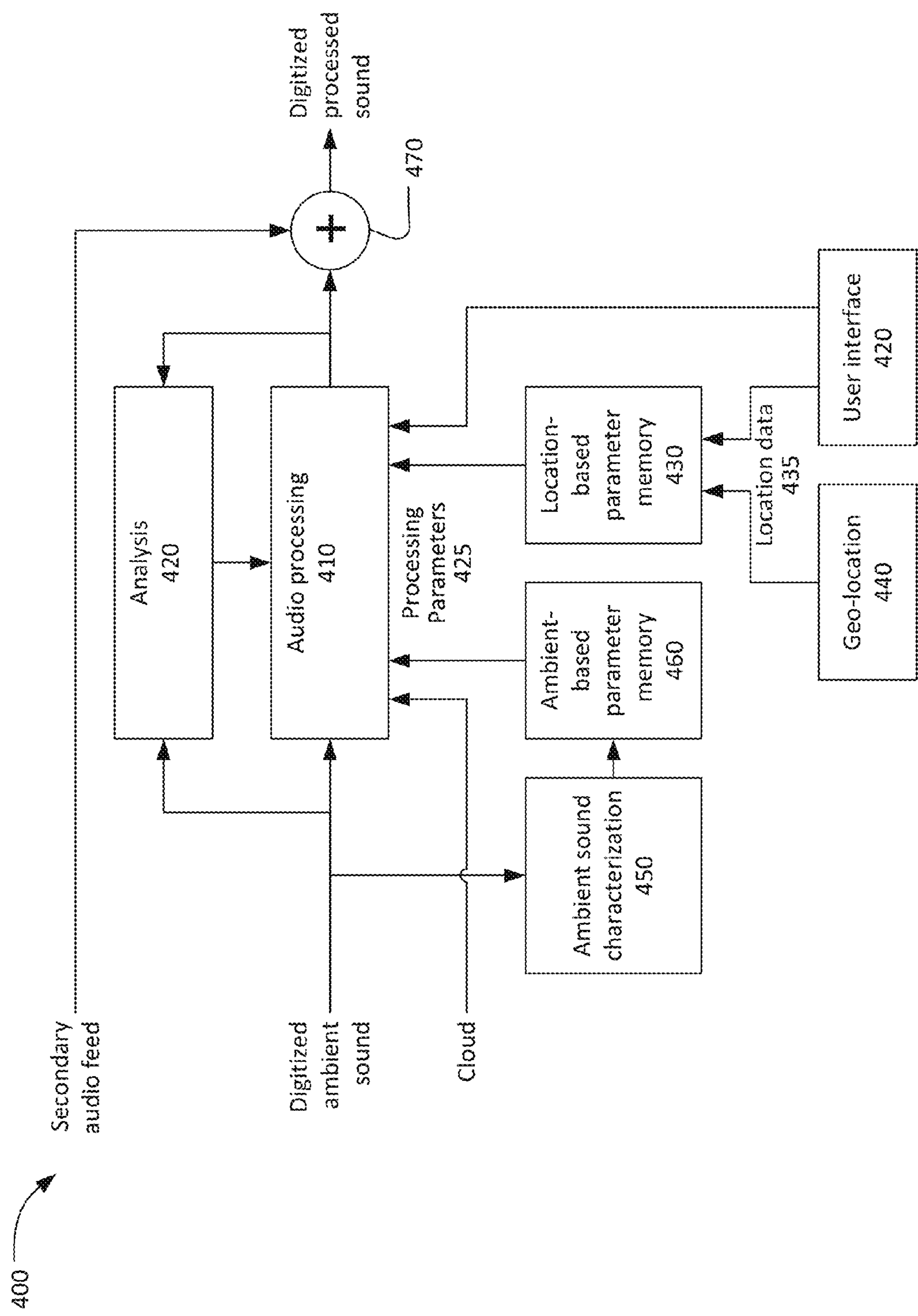
FIG. 4 is a functional block diagram of a portion of an active acoustic filter system.

FIG. 4 shows a functional block diagram of a portion of an exemplary active acoustic filter system 400, which may be the active acoustic filter system 340. Digitized ambient sound is processed by an audio processing function 410 implemented by a processor such as the processor 230. The processor performing the audio processing function may include one or more processor devices such as a microcontroller, a microprocessor, and/or a digital signal processor. The audio processing function 410 may include filtering, equalization, compression, limiting, and other processes. Filtering may include high-pass, low-pass, band-pass, and band-reject filtering. Equalization may include dividing the ambient sound into a plurality of frequency bands and subjecting each of the bands to a respective attenuation or gain. Equalization may be combined with filtering, such as a narrow band-reject filter to suppress a particular objectionable component of the ambient sound. Compression may be used to alter the dynamic range of the ambient sound such that louder sounds are attenuated more than softer sounds. Compression may be combined with filtering or with equalization such that louder frequency bands are attenuated more than softer frequency bands. Limiting may be used to attenuate louder sounds to a predetermined loudness level without attenuating softer sounds. Limiting may be combined with filtering or with equalization such that louder frequency bands are attenuated to a defined level while softer frequency bands are not attenuated or attenuated by a smaller amount. Techniques for implementing filters, limiters, compressors, and limiters are known to those of skill in the art of digital signal processing.

The audio processing function 410 may also include adding echo or reverberation to the ambient sound. The audio processing function 410 may also include detecting and cancelling an echo in the ambient sound. The audio processing function 410 may further include noise reduction processing. Techniques to add or suppress echo, to add reverberation, and to reduce noise are known to those of skill in the art of digital signal processing.

The audio processing function 410 may be performed in accordance with processing parameters 425. The processing parameters 425 may define the type and degree of one or more processes to be performed on the digitized ambient sound. For example, the processing parameters 425 may define filtering by a low pass filter with a particular cut-off frequency (the frequency at which the filter start to attenuate) and slope (the rate of change of attenuation with frequency) and/or compression using a particular function (e.g. logarithmic). For further example, the processing parameters 425 may define the plurality of frequency bands for equalization and provide a respective attenuation or gain for each frequency band. In yet another example, the processing parameters may define a delay time and relative amplitude of an echo to be added to the digitized ambient sound. The number and format of the processing parameters 425 may vary depending on the type of processing to be performed.

The audio processing function 410 may be defined, in part, based on analysis of the ambient sound by an analysis function 420, which may be implemented by the same processor, or a different processor, as the audio processing function 410. The analysis function 420 may analyze the digitized ambient sound and/or the digitized sound output from the processing function 410 to determine, for example, an overall (i.e. across the entire audible frequency spectrum) loudness level or the loudness level within particular frequency bands. For further example, the analysis function 420 may transform the digitized ambient sound and/or the digitized sound output from the processing function 420 into the frequency domain using, for example, a windowed Fourier transform. The transformed sound may then be analyzed to determine the distribution of the ambient sound within the audible frequency spectrum and/or to detect the presence of dominant sounds at particular frequencies. The analysis function 420 may perform other analysis to determine other characteristics of the digitized ambient sound and/or the digitized sound output from the processing function 410.

All or a portion of the processing parameters 425 for the audio processing function 432 may define processes dependent on the analysis of the ambient sound. For example, a first processing parameter may require that the overall loudness of the processed sound output from the active acoustic filter system 400 be less than a predetermined value. The analysis function 420 may determine the overall loudness of the ambient sound and the audio processing function 410 may than provide an appropriate amount of overall attenuation. For a specific example, if the overall loudness of the ambient sound is 100 phon and the processing parameter requires to the output sound to be no greater than 60 phon, the audio processing function 410 may cause an overall perceptual attenuation of 40 dB. However, if the overall loudness of the ambient sound is only 40 phon, the audio processing function 410 may provide no overall attenuation. For another example, a user in a dance club may want bass frequencies (the lowest frequency portion of the audible spectrum) to be louder than any other portion of the audible frequency spectrum. In another situation, for example on an airplane, the same user may want bass frequencies to be suppressed relative to the mid-range frequencies of human speech. For further example, in the situation where the analysis function 420 detects a dominant narrow-band sound (e.g. a microphone feed-back squeal), the audio processing function 410 may provide a narrow-band band-reject filter at the corresponding frequency. In all of these examples, the audio processing function 410 may need to adapt to the characteristics of the ambient sound as determined by the analysis function 420.

The processing parameters 425 that define the processes performed in the audio processing function 410 may be received or retrieved from several sources. The processing parameters 425 may be received from a user of the active acoustic filter system 400. The user may manually enter processing parameters via a user interface 420, which may be the user interface of a personal computing device such as the personal computing device 320.

The processing parameters 425 may be received from a device or devices within the cloud. For example, a website accessible via the cloud may list recommended sets of processing parameters for different venues, bands, sporting events, and the like. A social media application may survey users of active acoustic filters at a particular venue or event to develop a crowd-consensus set of processing parameters for that venue or event.

The processing parameters 425 may be location-based, which is to say the processing parameters may be associated with a current location of the active acoustic filter system 400. The current location may be a specific location (e.g. "user's living room", "user's office", etc.) or a generic location (e.g. "sporting event", "dance club", "concert", "airplane", etc.). A location-based parameter memory 430 may store one or more sets of location-based processing parameters in association with data defining respective locations. The appropriate processing parameters may be retrieved from location-based parameter memory 430 based on location data 435 identifying the current location of the active acoustic filter system 400. The location data 435 may be provided by a geo-location function 440. The geo-location function may use GPS, cell tower signal strength, or some other technique for identifying the current location. The location data 435 may be provided by the user via the user interface 420. For example, the user may select a location from a list of locations for which processing parameters are stored in the location-based parameter memory 430. The location data 435, particularly for a generic location, may be retrieved from a cloud external to the active acoustic filter system 400. The location data 435 may obtained by some other technique.

The one or more sets of location-based processing parameters may have been stored in the location-based parameter memory 430 during prior visits to the corresponding locations. For example, the user of the active acoustic filter system 400 may manually set processing parameters for their home and save the processing parameters in the location-based parameter memory 430 in association with the location "home". Similarly, the user may set and save processing parameters for other locations (e.g. "work", "concert", "airplane", etc.). Upon returning to these locations, the corresponding processing parameters may be automatically retrieved from the location-based parameter memory 430.

The processing parameters 425 may be ambient-based, which is to say the processing parameters may be associated with particular characteristics of the ambient sound. The active acoustic filter system 400 may "listen" to the ambient sound and learn what filter parameters the user sets in the presence of various ambient sound characteristics. Once the user's listening preferences have been learned, the active acoustic filter may select or suggest processing parameters appropriate for the characteristics of the current ambient sound.

For example, an ambient-based parameter memory 460 may store one or more ambient sound "profiles" with respective sets of ambient-based processing parameters previously defined by the user. Each ambient sound profile may include characteristics such as, for example, an overall loudness level, the relative loudness of predetermined frequency bands, the presence of dominant narrow-band sounds, and other characteristics. An ambient sound characterization function 450, which may work in conjunction with or in parallel to the analysis function 420, may develop a profile of the current ambient sound. The profile determined by the ambient sound characterization function 450 may be used to retrieve appropriate ambient-based processing parameters from the ambient-based processing parameter memory 460.

The one or more sets of ambient-based processing parameters may have been stored in the ambient-based parameter memory 460 during prior exposure to ambient sound having particular profiles. For example, the user of the active acoustic filter system 400 may manually set processing parameters during a visit to a dance club. These processing parameters may be saved in the ambient-based parameter memory 430 in association with the profile of the ambient sound in the dance club. The processing parameters may be saved in the ambient-based parameter memory 430 in response to a user action, or may be automatically "learned" by the active acoustic filter system 400. Upon returning to the same or a different dance club, the appropriate ambient-based processing parameters may be automatically retrieved from the ambient-based parameter memory 460.

While FIG. 4 depicts the ambient-based parameter memory 460 and the location-based parameter memory 430 separately, these may be a common memory that associates each stored set of processing parameters with a location, with an ambient sound profile, or both.

Optionally, an adder 470 may add a secondary audio feed to the output from the audio processing function 410 to produce the digitized processed sound. The secondary audio feed may be received by the active acoustic filter system 400 from an external source via a wireless communications link. For example, a user at a sporting event may receive a secondary audio feed of a sportscaster describing the event, which would then be superimposed on the processed ambient sound of the event itself.

The depiction in FIG. 4 of the active acoustic filter system 400 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the audio processing function 410, the analysis function 420, and the adder 470 may be implemented within an active acoustic filter packaged within an earbud or other housing configured to interface with a user's ear. The geo-location function 440 and the user interface 420 may be implemented by a personal computing device coupled to the active acoustic filter by a wireless communications link. The ambient sound characterization function 450, the ambient-based parameter memory 460 and the location-based parameter memory 430 may be located within the active acoustic filter or the personal computing device or distributed between the active acoustic filter and the personal computing device.

At the time of this application, the power consumption of a GPS receiver or other geo-location system precludes performing geo-location within an earbud active acoustic filter. In the future, the location data 435 may be determined by a geo-location function performed by a processor within an active acoustic filter.

Description of Processes

Figure 5:
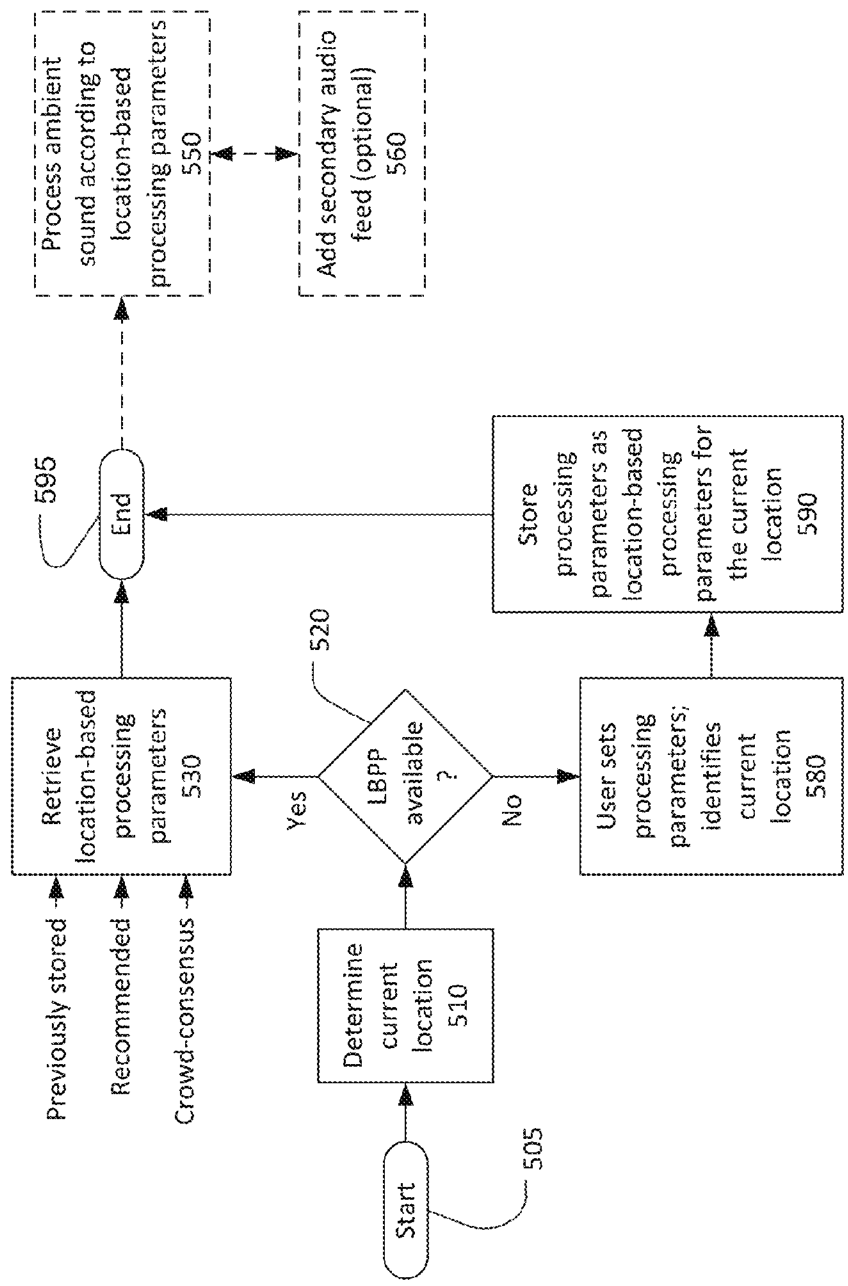
FIG. 5 is a flow chart of a method for setting processing parameters for an active acoustic filter.

Referring now to FIG. 5, a process for setting processing parameters for an active acoustic filter, such as the active acoustic filter 200, begins at 505 and ends at 595. At 510, a current location of the active acoustic filter may be determined. In most situations, the current location need not be determined precisely since proximate locations in the same environment commonly receive the same ambient sound. The current location determined at 610 may be a specific location (e.g. "user's living room", "user's office", etc.) or a generic location (e.g. "sporting event", "dance club", "concert", etc.).

The current location may be determined, for example, by a personal computing device, such as the personal computing device 320, coupled to the active acoustic filter via a first wireless communications link. A specific current location may be identified, for example, by geo-location using GPS, cell tower signal strength, or some other method. A current location identified by geo-location may be compared to previous locations (i.e. locations for which location-based processing parameters are stored) and considered to be the same as a previous location in close proximity. A generic current location, may be determined by requesting user input via a user interface of the personal computing device. For example, the user may be asked to select the current location from a list of previous locations or to provide an identifier for a new current location. The current location may be determined in some other manner.

At 520, a determination may be made whether or not location-based processing parameters (LBPP) are available for the current location determined at 510. Location-based processing parameters may be available from a variety of sources. For example, the current location determined at 510 may be the same as, or in close proximity to, a previous location for which location-based processing parameters are stored within the active acoustic filter, the personal computing device, or a cloud accessible to either the active acoustic filter or the personal computing device. For further example, when the current location is concert or sports venue, the venue may provide recommended location-based processing parameters. Alternatively or additionally, a venue may collect and average processing parameters set by a plurality of users within the venue and provide a set of crowd-consensus processing parameters.

When a determination is made at 520 that location-based processing parameters are available for the current location ("yes" at 520), the location-based processing parameters may be retrieved at 530. Previously-stored location-based processing parameters for the current location may be retrieved from memory within the active acoustic filter, the personal computing device, or the cloud. Recommended or crowd-consensus location-based processing parameters may be retrieved from the cloud.

After retrieving location-based processing parameters for the current location at 530, the process 500 may end at 595. Note that, while the process 500 for setting processing parameters has ended, the use of the location-based processing parameters may continue. Specifically, the location based processing parameters may be used to process ambient sound at 550 and adding a secondary audio feed if available at 560.

When a determination is made at 520 that location-based processing parameters are not available for the current location ("No" at 520), the user may set processing parameters for the active acoustic filter at 580. For example, a graphical user interface may be provided on a display of the user's personal computing device to allow the user to enter or select processing parameters. At 580, the user may also be prompted to identify, or provide an identifier for, the current location. At 590, the processing parameters entered at 580 may be stored as location-based processing parameters for the location identified by the user at 580. The location-based processing parameters may be stored, with the active acoustic filter, within the user's personal computing device, and/or on the cloud.

After location-based processing parameters for the current location have been set at 580 and stored at 590, the process 500 may end at 595. The use of the location-based processing parameters may continue at 550 and 560 as previously described.

Figure 6:
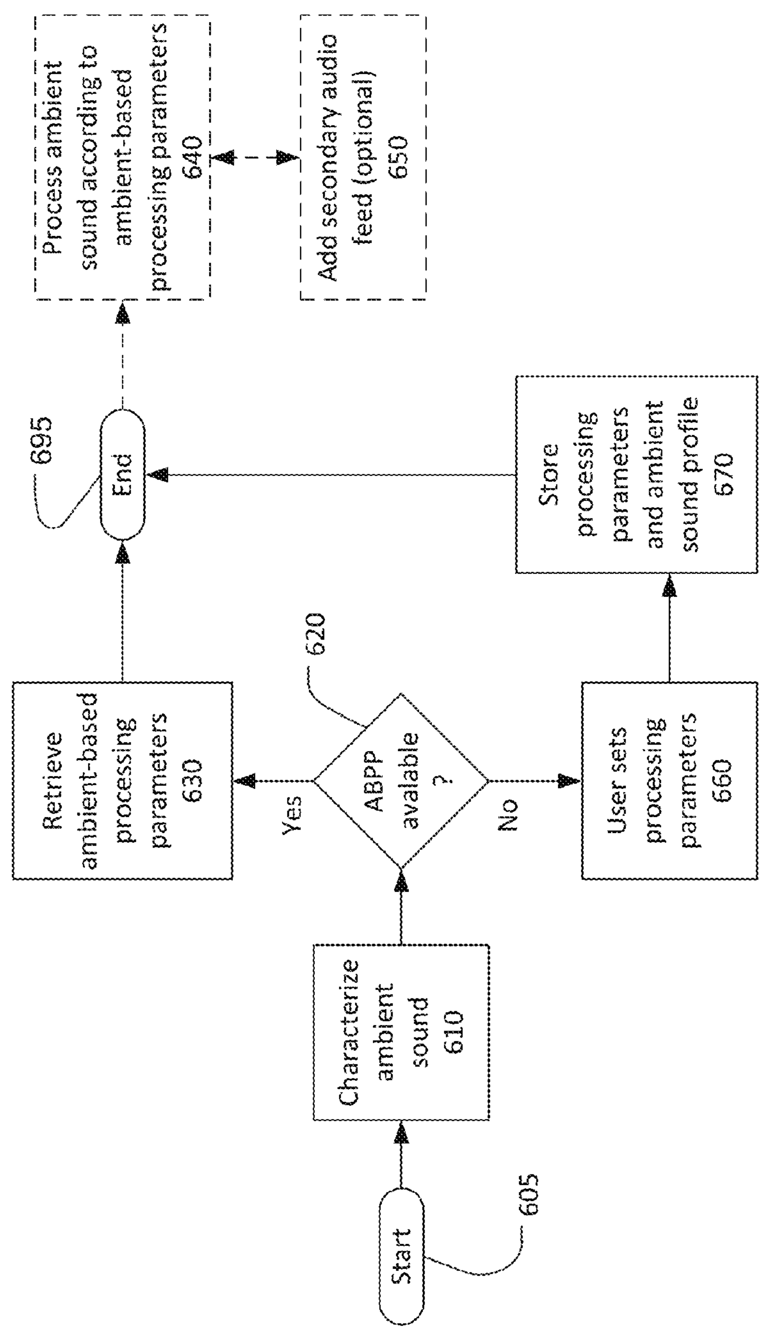
FIG. 6 is a flow chart of another method for setting processing parameters for an active acoustic filter.

Referring now to FIG. 6, another process for setting processing parameters for an active acoustic filter, such as the active acoustic filter 200, begins at 605 and ends at 695. The process 600 may be initiated by a user, or may be initiated automatically in recognition of a significant change in the characteristics of the ambient sound. At 610, the ambient sound may be characterized to determine an ambient sound profile. The ambient sound profile may include characteristics such as overall loudness, relative loudness of predetermined frequency bands, the presence of dominant narrow-band sounds or random noise, and/or other characteristics.

At 620, a determination may be made whether or not ambient-based processing parameters (ABPP) are available for ambient sound having a profile that is the same or similar to the profile determined at 610. For example, a memory may store ambient sound profiles for one or more environments in association with respective sets of processing parameters. At 620, the profile determined at 610 may be compared with the profiles stored in the memory to determine if the memory holds ambient-based processing parameters for ambient sound have the same, or reasonably similar, profile.

When a determination is made at 620 that ambient-based processing parameters are available for the current ambient sound profile ("yes" at 620), the appropriate ambient-based processing parameters may be retrieved at 630.

After retrieving ambient-based processing parameters for the current ambient sound at 630, the process 600 may end at 695. Note that, while the process 600 for setting processing parameters has ended, the use of the ambient-based processing parameters may continue. Specifically, the ambient-based processing parameters may be used to process ambient sound at 640, including adding a secondary audio feed if available at 660.

When a determination is made at 620 that location-based processing parameters are not available for the current ambient sound profile ("No" at 620), the user may set processing parameters for the active acoustic filter at 660. For example, a graphical user interface may be provided on a display of the user's personal computing device to allow the user to enter or select processing parameters. At 670, the processing parameters entered at 880 may be stored as ambient-based processing parameters in association with the ambient sound profile determined at 610. The ambient-based processing parameters may be stored, with the active acoustic filter, within the user's personal computing device, and/or on the cloud.

After ambient-based processing parameters for the current ambient sound characteristics have been set at 660 and stored at 670, the process 600 may end at 695. The use of the location-based processing parameters may continue at 640 and 650 as previously described.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An active acoustic filter system, comprising:

a housing configured to interface with a user's ear;

an input subsystem disposed within the housing and comprising a microphone to receive ambient sound and generate ambient sound signals, a preamplifier and an analog to digital converter coupled to one another, the input subsystem configured to convert the ambient sound signals into digitized ambient sound signals;

a memory storing data defining one or more locations and a respective set of location-based processing parameters corresponding with each of the one or more locations;

a geolocation engine configured to determine a current location of the active acoustic filter system;

a processor disposed within the housing and coupled to the input subsystem, wherein the processor generates digitized processed sound signals by processing the digitized ambient sound signals in accordance with the set of location-based processing parameters stored in the memory which corresponds to the determined current location of the active acoustic filter system provided by the geolocation engine; and an output subsystem disposed within the housing and coupled to the processor, the output subsystem comprising a digital to analog converter, an amplifier and a speaker coupled to one another, the output subsystem configured to convert the digitized processed sound signals into processed output sounds for the user's ear through the speaker;

wherein at least one of the sets of location-based processing parameters comprises a collection and average of processing parameters set by a plurality of users within the determined current location for the processing of the digitized ambient sound signals.

2. The active acoustic filter of claim 1, wherein:

the housing is an earbud housing configured to fit, at least partially, within and be supported by a user's ear.

3. The active acoustic filter system of claim 1, wherein:

the processor is further to add a secondary audio feed to the digitized processed sound signals, the secondary audio feed received from a device external to the active acoustic filter system.

4. The active acoustic filter system of claim 1, wherein:

the processor is further configured to add a secondary audio feed to the digitized processed sound signals.

5. The active acoustic filter system of claim 1, wherein processing digitized ambient sound signals includes one or more of equalization, reverberation and noise suppression.

6. A method for processing ambient sound to provide processed sound to an ear of a user in an active acoustic filter system, comprising:

determining a current location of the active acoustic filter system by a geolocation engine;

retrieving, from a memory which stores data defining one or more locations and a respective set of location-based processing parameters associated with each of the one or more locations, the set of location-based processing parameters which corresponds to the determined current location;

converting ambient sound signals into digitized ambient sound signals;

processing the digitized ambient sound signals in accordance with the retrieved location-based processing parameters to provide digitized processed sound signals, the processing performed by a processor within a housing configured to interface with the ear of the user;

converting the digitized processed sound signals into processed output sound for the user's ear;

wherein at least one of the stored sets of location-based processing parameters comprises a collection and average of processing parameters set by a plurality of users within the determined current location for the processing of the digitized ambient sound signals.

7. The method for processing ambient sound of claim 6, further comprising:

the processor adding a secondary audio feed to the digitized processed sound signals, the secondary audio feed received by the processor via a wireless communications link.

8. The method for processing ambient sound of claim 6, wherein processing the ambient sound signals includes one or more of equalization, reverberation and noise suppression.

9. The method for processing ambient sound of claim 6, wherein the housing is an earbud housing configured to fit, at least partially, within and be supported by the user's ear.

* * * * *